(12) United States Patent
Park et al.

(10) Patent No.: US 8,072,516 B2
(45) Date of Patent: Dec. 6, 2011

(54) DYNAMIC RANGE ENHANCEMENT METHOD AND APPARATUS

(75) Inventors: Min Kyu Park, Seoul (KR); Hyun Hee Park, Seoul (KR); Sung Dae Cho, Yongin-si (KR); Moon Gi Kang, Seoul (KR); Jong Seong Choi, Seoul (KR); Young Seok Han, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 475 days.

(21) Appl. No.: 12/315,028

(22) Filed: Nov. 26, 2008

(65) Prior Publication Data
US 2009/0141151 A1    Jun. 4, 2009

(30) Foreign Application Priority Data

Nov. 29, 2007 (KR) .............................. 2007-0122645

(51) Int. Cl.
*H04N 5/202* (2006.01)
*H04N 5/235* (2006.01)
*G03B 7/00* (2006.01)

(52) U.S. Cl. ....................... 348/254; 348/362
(58) Field of Classification Search ............... 348/222.1, 348/254–256, 362–368; 358/519
See application file for complete search history.

(56) References Cited

U.S. PATENT DOCUMENTS

| | | | |
|---|---|---|---|
| 6,492,868 B2 | 12/2002 | Kirn | |
| 7,330,286 B2 * | 2/2008 | Fukasawa | 358/1.9 |
| 7,511,770 B2 * | 3/2009 | Blonde et al. | 348/674 |
| 7,933,445 B2 * | 4/2011 | Pan et al. | 382/167 |
| 2002/0181000 A1 * | 12/2002 | Fukasawa et al. | 358/1.9 |
| 2004/0119874 A1 * | 6/2004 | Imai | 348/362 |
| 2006/0164524 A1 * | 7/2006 | Shibano et al. | 348/234 |
| 2007/0153305 A1 * | 7/2007 | Reid | 358/1.9 |

* cited by examiner

*Primary Examiner* — Jason Chan
*Assistant Examiner* — Pritham Prabhakher
(74) *Attorney, Agent, or Firm* — Cha & Reiter, LLC

(57) ABSTRACT

A dynamic range enhancement method and apparatus for an imaging device expands a dynamic range of an input image without an associated increase in the amount of image calculations. The dynamic range enhancement method includes producing brightness information and color information from an input image; applying gamma correction and inverse gamma correction to the brightness information to produce a gamma corrected image and an inverse gamma corrected image; comparing variances of the gamma corrected image and the inverse gamma corrected image at identical spots; and expanding a dynamic range of the input image by selecting one of the variances at each spot. The dynamic range of an input image is expanded by applying a post imaging process without increasing calculation amount of the imaging device.

9 Claims, 7 Drawing Sheets
(4 of 7 Drawing Sheet(s) Filed in Color)

DYNAMIC RANGE ENHANCEMENT METHOD AND APPARATUS

CLAIM OF PRIORITY

This application claims priority to an application entitled "DYNAMIC RANGE ENHANCEMENT METHOD AND APPARATUS" filed in the Korean Intellectual Property Office on Nov. 29, 2007 and assigned Serial No. 2007-0122645, the contents of which are incorporated herein by reference in its entirety.

BACKGROUND OF THE INVENTION

1. Field of the Invention

The present invention relates to an imaging device and a dynamic range enhancement method and apparatus therefore to improve image quality.

2. Description of the Related Art

An image sensor is a device that converts an optical image to an electric signal. Typically, an image sensor comprises a Charge-Coupled Device (CCD) or a Complementary Metal-Oxide-Silicon (CMOS) sensor. A CCD image sensor typically serializes parallel analog signals, which are in arrays of photoelectric light sensors by capacitors transferring an electric charge of each pixel to a common output structure which converts the charge to a voltage and buffers and sends the voltage off-chip. On the other hand, in a CMOS image sensor, pixels represented by respective MOS transistors convert the charges to voltages and the voltages are output in accordance with switching operations of the transistors.

One of the most important factors in determining product quality of an imaging device is its dynamic range of the pixels. Dynamic range is a ratio of a pixel's saturation level to its signal threshold. Typically, the dynamic range refers to the maximum signal power that the device can tolerate without distortion of the input signal. In an image sensor, as the dynamic range of a device is increased, the ability to measure the dimmest intensities in an image is improved, resulting in good image quality.

In order to expand the dynamic range, a signal variation-based dynamic range expansion method has been used with limited success. The dynamic range expansion (DRE) method differentiates a signal and adjusts the differentiated signal to expand the dynamic range. In the DRE method, the dynamic range characteristic of the signal changes by varying the differential value. This signal variation-based dynamic range expansion method is useful for one-dimensional voice signals. However, this method is not suited for processing two-dimensional images signal due to large calculations of quadratic calculus and associated iterations.

Another conventional dynamic range expansion method uses multiple images taken at different exposure levels. This particular method estimates a response function of the image sensor using multiple images taken at different exposure levels and compensates the image by taking an inverse function of the response function. However, this method has several drawbacks, such as requiring a large memory for storing the multiple images, and the iterative process and is restricted for applying to real time applications.

SUMMARY OF THE INVENTION

The present invention provides a dynamic range enhancement method and apparatus that expands a dynamic range of an image without increasing a calculation amount.

Also, the present invention provides a dynamic range enhancement method and apparatus for expanding a dynamic range of an image using a gamma correction and inverse gamma correction technique.

Also, the present invention provides a dynamic range enhancement method and apparatus for expanding the dynamic range of an image using a weighted average of gamma corrected values and inverse gamma corrected values.

In accordance with an exemplary embodiment of the present invention, a dynamic range enhancement method can include the steps of producing brightness information and color information from an input image; applying gamma correction and inverse gamma correction to the brightness information to produce a gamma corrected image and an inverse gamma corrected image; comparing variances of the gamma corrected image and the inverse gamma corrected image at identical spots; and expanding a dynamic range of the input image by selecting one of the variances at each spot.

In accordance with another exemplary embodiment of the present invention, a dynamic range enhancement apparatus may include a YUV transformer for extracting brightness information and color information from an input image; a gamma corrector for correcting the brightness information; an inverse gamma corrector for correcting the brightness information inversely; and a weighted averager for taking output values of the gamma corrector and the inverse gamma corrector and expanding the dynamic range of the input image by averaging the output values using a weighted average.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

The above features and advantages of the present invention will be more apparent from the following detailed description in conjunction with the accompanying drawings, in which.

DETAILED DESCRIPTION

Figure 1A:
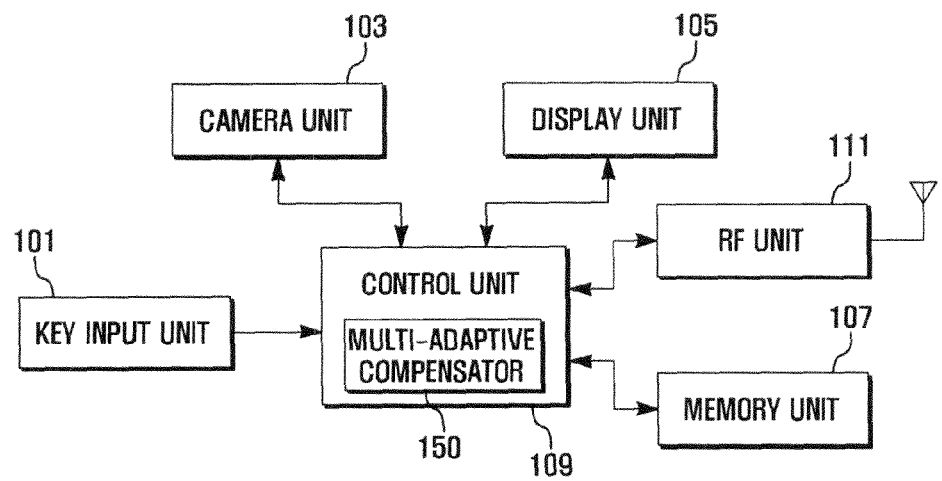
FIG. 1A is a block diagram illustrating a configuration of a portable device implemented with a dynamic range enhancement apparatus according to an exemplary embodiment of the present invention.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring appreciation of the subject matter of the present invention by a person of ordinary skill in the art. In the drawings, certain elements may be exaggerated or omitted or schematically depicted for clarity of the invention.

FIG. 1A is a block diagram illustrating a configuration of a portable device implemented with a dynamic range enhancement apparatus according to an exemplary embodiment of the present invention.

Referring to FIG. 1A, the portable device may include a key input unit 101, a camera unit 103, a display unit 105, a memory unit 107, and a control unit 109.

The key input unit 101 is provided with a plurality of keys for receiving user's key input. The key input unit 101 is configured to generate a command for capturing an image.

The camera unit 103 takes an image of an object and generates an image signal. The camera unit 103 is provided with an image sensor for converting the optical image to an electric signal and a signal processor for converting the electric signal to a digital signal. The image sensor may comprise, for example CCD and CMOS image sensors. The camera unit 103 may further include a video processor for generating screen image data. The video processor is preferably provided with a video codec for compressing and decompressing the video data so as to be displayed on the display unit 105.

The display unit 105 displays operation status of the portable device and various visual information. The display unit 105 also displays the image input by the camera unit 103. Particularly in this exemplary embodiment, the display unit 105 is configured to display a gamma corrected image and inverse gamma corrected image.

Still referring to FIG. 1A, the memory unit 107 stores application programs and data associated with the operations of the portable device.

The control unit 109 controls general operations of the portable device. In this particular exemplary description, the control unit 109 controls to enhance the dynamic range of an input image. The control unit is provided with a multi-adaptive compensator 150. The multi-adaptive compensator 150 performs the gamma correction and inverse gamma correction on the image input by the camera unit 103 and expands the dynamic range of the compensated image such that the enhanced image is displayed on the display unit 105. The dynamic enhancement procedure is described in more detail with reference to FIG. 1B.

In the meantime, the portable device may further include a radio frequency (RF) unit 111 for allowing radio communication. The RF unit 111 may include a transceiver or a separate RF transmitter for up-converting and amplifying a signal to be transmitted and an RF receiver for low noise amplifying and down-converting a signal received through an antenna.

An internal structure of the multi-adaptive compensator for enhancing the dynamic range of an image is described in more detail.

Figure 1B:
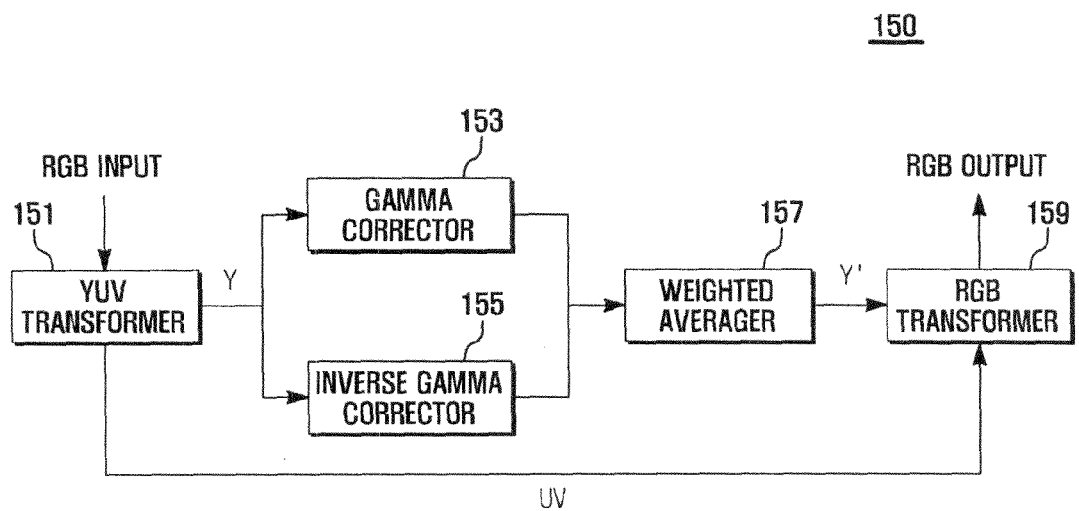
FIG. 1B is a block diagram illustrating a configuration of the multi-adaptive compensator of FIG. 1A.

FIG. 1B is a block diagram illustrating a configuration of the multi-adaptive compensator of FIG. 1A.

Referring to FIG. 1B, the multi-adaptive compensator 150 includes a YUV (luminance and chrominance) transformer 151, a gamma corrector 153, an inverse gamma corrector 155, a weighted averager 157, and an RGB transformer 159.

When an image is input through the camera unit 103, the multi-adaptive compensator 150 extracts Red, Green, and Blue (RGB) information from the image. The RGB information is converted to YUV information. Here, Y information represents the brightness, U information is obtained by subtracting the Y from the blue signal of the original RGB and then scaling, and V information is created by subtracting the Y from the red and scaling by a different factor. The YUV transformer 151 uses transformation equations for obtaining the YUV information from the RGB information:

$$Y=0.3R+0.59G+0.11B$$

$$U=(B-Y)\times 0.493$$

$$V=(R-Y)\times 0.877$$

The control unit 109 controls the YUV transformer 151 to send the Y information, i.e. brightness, to the gamma corrector 153 and the inverse gamma corrector 155.

The gamma correction is performed by transforming the intensity of the light nonlinearly using a nonlinear transfer function. According to the Weber's law, human vision operates nonlinearly in response to the brightness. When light amount varies linearly in a limited expressive information amount, a human eye perceives a breakage rather than a smooth change. Accordingly, in order to show the optimal vision quality in the limited expressive information amount, a nonlinear coding should be used. The inverse gamma correction is performed by inversing the gamma correction.

Figure 2:
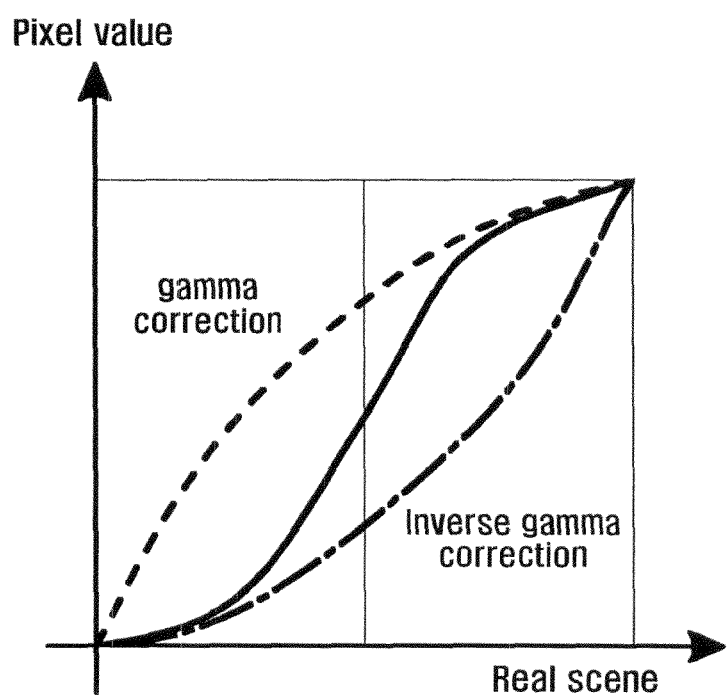
FIG. 2 is a graph illustrating gamma correction and inverse gamma correction curves referred for a dynamic range enhancement method according to an exemplary embodiment of the present invention

FIG. 2 is a graph illustrating gamma correction and inverse gamma correction curves referred for a dynamic range enhancement method according to an exemplary embodiment of the present invention.

The gamma corrector 153 brightens the dark area of an image so as to make a sensor response function linear at the dark area. The inverse gamma corrector 155 darkens the bright area of the image so as to make a sensor response function linear at the bright area. In this manner, an image input by the camera unit 103 is converted to the YUV information and then compensated by the gamma corrector 153 and inverse gamma corrector 155.

Figure 3A:
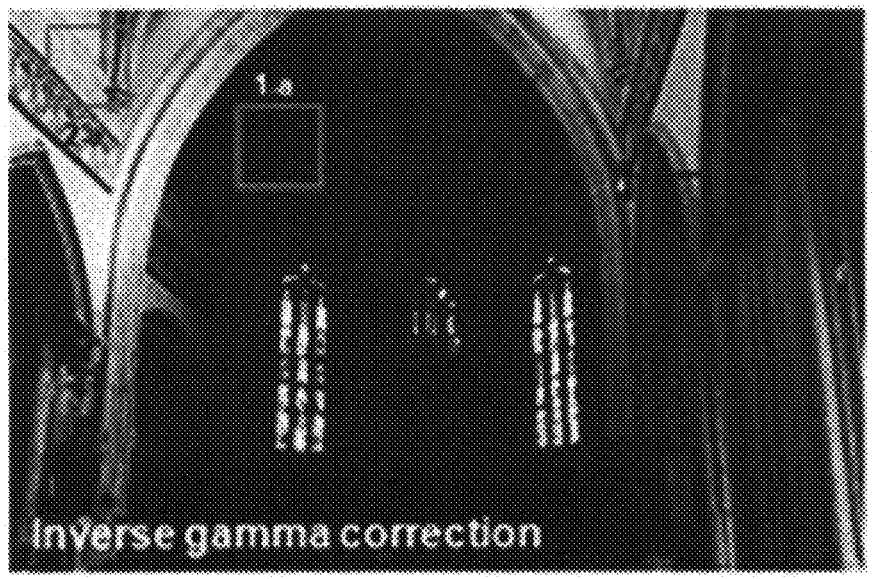
FIG. 3A is an image illustrating a result of inverse gamma correction of a dynamic range enhancement method according to an exemplary embodiment of the present invention.
Figure 3B:
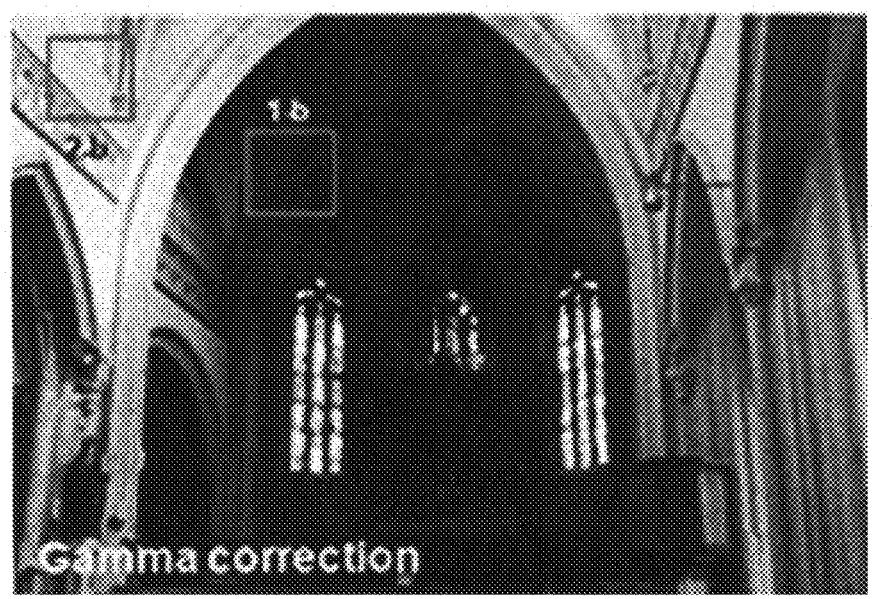
FIG. 3B is an image illustrating a result of gamma correction of a dynamic range enhancement method according an exemplary embodiment of the present invention.

FIG. 3A is an image illustrating a result of inverse gamma correction of a dynamic range enhancement method according to an exemplary embodiment of the present invention, and FIG. 3B is an image illustrating a result of gamma correction of a dynamic range enhancement method according an exemplary embodiment of the present invention. Information values output by the gamma corrector 153 and inverse gamma corrector 155 are selectively used for compensating the sensor response function. At this time, the control unit 109 compares variances of the two images of FIGS. 3A and 3B at an identical local area and selects the value greater than the other.

Referring to FIGS. 3A and 3B, the control unit 109 compares the variances at the areas 1-$a$ and 2-$a$ of the inverse gamma corrected image of FIG. 3A with the variances at the corresponding areas 1-$b$ and 2-$b$ of the gamma corrected image of FIG. 3B.

As a result of the above comparison, it is determined that the variance of the areas 1-$a$ is less than the variance of the area 1-$b$ and the variance of the area 2-$a$ is greater than the variance of the area 2-$b$. Accordingly, the control unit 109 selects the value of the area 1-*b* of the gamma corrected image and the value of the area 2-*a* of the inverse gamma corrected image.

Although the variances of the two local areas are compared each other in this exemplary embodiment, the gamma and inverse gamma corrected images can be, for example, globally compared with each other.

Figure 3C:
FIG. 3c is an image illustrating gamma correction and inverse gamma correction of an input image obtained through a dynamic range enhancement method according to an exemplary embodiment of the present invention.

FIG. 3C is an image illustrating gamma correction and inverse gamma correction areas of an input image obtained through a dynamic range enhancement method according to another exemplary embodiment of the present invention. In FIG. 3C, black area is the gamma compensated area and white area is the inverse gamma compensated area.

Now referring again to FIG. 1B, 2hen selecting one of the values output by the gamma corrector 153 and the inverse gamma corrector 155, the weighted averager 157 uses the weight average of the two output values. In order to avoid the discontinuity at the boundary between the two areas when using one of the two values, the weighted averager 157 takes a weight average of the two values. The average weigh calculator 157 can be implemented, for example, as follows:

```
if(var(x1)==0&& var(x2)==0) {
       y=(x1+x2)/2
}
else{
       y=(var(x1)*x1+var(x2)*x2)/(var(x1)+var(x2))
}
``` where x1 denotes the gamma corrected value, x2 denotes the inverse gamma corrected value, var(x1) denotes the variance of the gamma corrected value, and var(x2) denotes the variance of the inverse gamma corrected value. The weighted averager 157 uses the variance as weight such that the larger the variance is, the larger the weight is. Since average weigh calculator 157 has a similar variance at the boundary of two areas, a value close to the linear average of the two areas is reflected to the result. Accordingly, the discontinuous effect at the boundary, appeared when selecting the value comprehensively, can be removed.

The RGB transformer 159 transforms the YUV information so as to output the RGB information. The RGB transformer 159 receives Y' information output by the weighted averager 157 and UV information output by the YUV transformer 151 and generates RGB information using the Y' information and the UV information. The RGB transformer 159 transforms the YUV information to the RGB information using the following equations:

$$R=Y+0.956U+0.621V$$

$$G=Y+0.272U+0.647V$$

$$B=Y+1.061U+1.703V.$$

Figure 4:
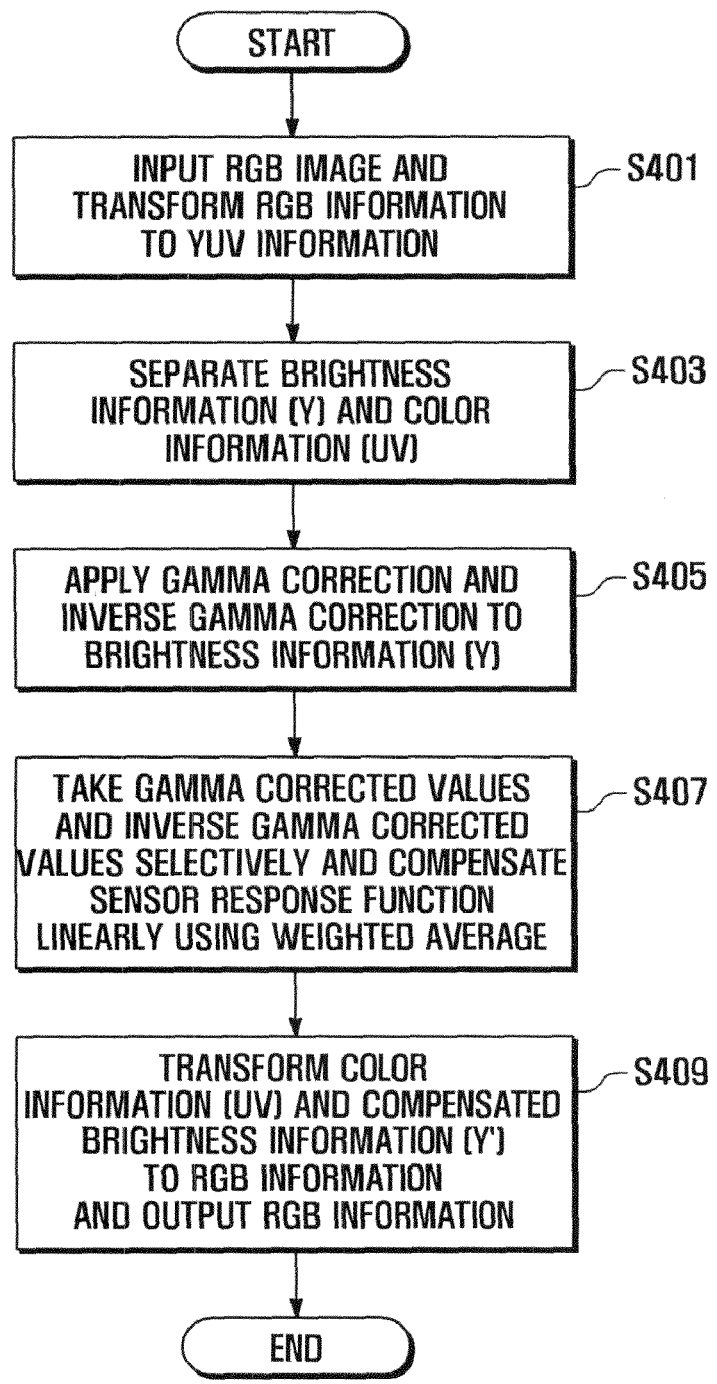
FIG. 4 is a flowchart illustrating a dynamic range enhancement method according to an exemplary embodiment of the present invention.

FIG. 4 is a flowchart illustrating exemplary steps of a dynamic range enhancement method according to an exemplary embodiment of the present invention.

Referring to FIG. 4, the control unit 109 of the portable device receives RGB information and converts the RGB information into YUV information (S401). At this time, the control unit 109 checks the input of an image captured by the camera and control such that the YUV transformer transforms the RGB information of the input image into the YUV information.

Next, the control unit 109 extracts the Y information (brightness) and UV information (color) from the YUV information (S403). Here, the control unit 109 controls the YUV transformer 151 to separate the Y information and UV information. The control unit 109 only processes the brightness information, i.e. Y information.

After separating the Y information from the UV information, the control unit 109 performs gamma correction and inverse gamma correction on the Y information sequentially (S405). That is, the Y information is input to the gamma corrector 153 and the inverse gamma corrector 155 so as to be output in the form of gamma corrected information and inverse gamma corrected information in parallel (see FIG. 2).

Still referring to the flowchart in FIG. 4, the control unit 109 compares the gamma corrected value and the inverse gamma corrected value, selects one of the gamma corrected value and the inverse gamma corrected value, and compensates the sensor response function linearly using the weight average (S407). That is, the control unit 109 compares the values at the same local areas of the gamma corrected image output by the gamma corrector 153 and the inversed gamma corrected image output by the inverse gamma corrector 155 as shown in FIGS. 3A and 3B and selects one of the value. Then, the weighted averager 157 averages weight values to smoothen the discontinuous boundary.

Next, the control unit 109 transforms the compensated brightness information Y' and the color information UV so as to be output RGB information (S409). The RGB transformer 159 receives the Y' information output by the weight average 157 and the UV information output by the YUV transformer 151 and generates the RGB information using the Y' and UV information. The RGB information is output by the RGB transformer 150 is output to, for example, display unit 105 under the control of the control unit 109.

Figure 5A:
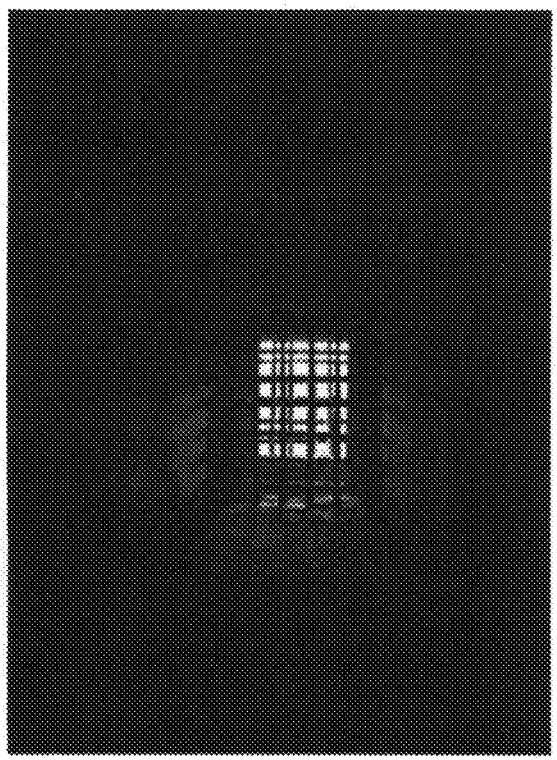
FIGS. 5A and 5B are exemplary images respectively obtained by a conventional imaging device and an imaging device adopted a dynamic range enhancement apparatus according to an exemplary embodiment of the present invention.
Figure 5B:
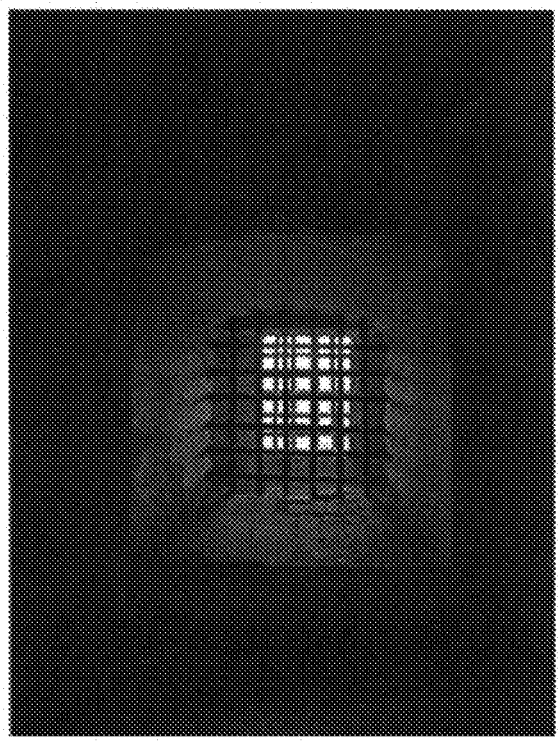
Figure 6A:
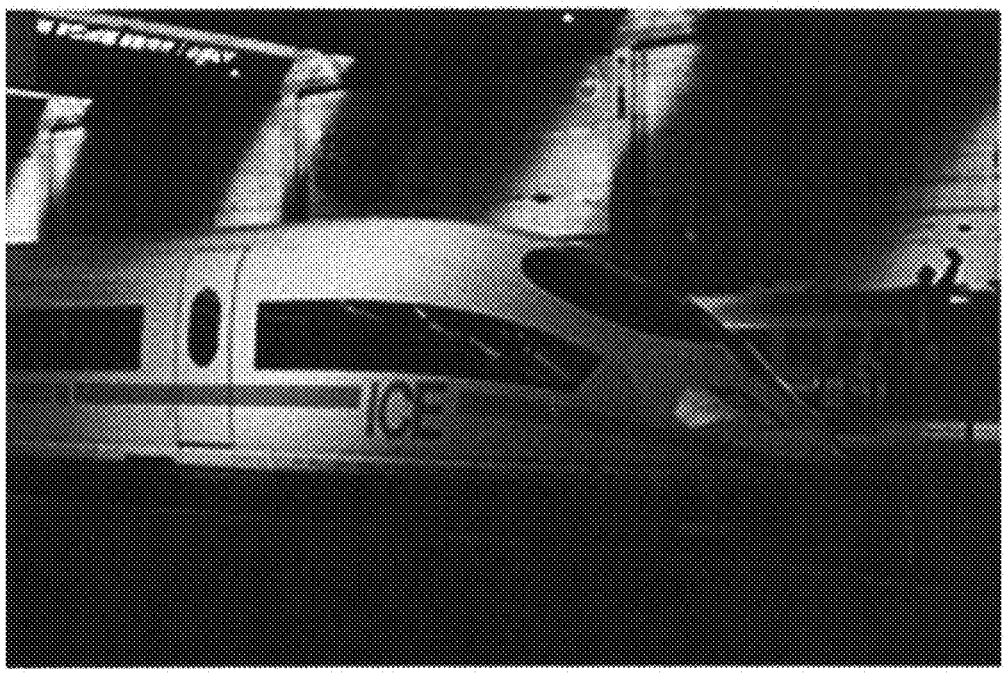
FIGS. 6A and 6B are another exemplary images respectively obtained by the conventional imaging device and an imaging device adopted a dynamic range enhancement apparatus according to an exemplary embodiment of the present invention.
Figure 6B:

FIGS. 5A and 5B show exemplary images obtained by a conventional imaging device and an imaging device adopted a dynamic range enhancement apparatus according to an exemplary embodiment of the present invention, respectively. FIGS. 6A and 6B show another exemplary images obtained by the conventional imaging device and the imaging device adopted the dynamic range enhancement apparatus according to an exemplary embodiment of the present invention, respectively.

The images of FIGS. 5A and 6A are photographs processed by the conventional image processing technique, and images of FIGS. 5B and 6B are photographs processed by the dynamic range enhancement method of the present invention. As shown in the FIGS. 5A, 5B, 6A, and 6B, the images acquired using the dynamic range enhancement method according to an embodiment of the present invention are superior to the image acquired by the conventional technique, especially in brightness quality.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

As described above, the dynamic range enhancement method and apparatus of the present invention expands a dynamic range of an input image by applying a post imaging process without increasing a calculation amount of the imaging device.

What is claimed is:

1. A dynamic range enhancement method comprising:
   producing brightness information and color information from an input image;

respectively applying gamma correction and inverse gamma correction to the brightness information to produce both a gamma corrected image and an inverse gamma corrected image;

comparing variances of the gamma corrected image and the inverse gamma corrected image at identical spots of both corrected images; and selecting one of the spots of both corrected images for expanding a dynamic range of the input image.

2. The dynamic range enhancement method of claim 1, wherein separate copies of the image are respectively gamma corrected and inverse gamma corrected.

3. The dynamic range enhancement method of claim 1, wherein the selecting one of the spots of both corrected images using a weighted average.

4. The dynamic range enhancement method of claim 3, wherein the weighted average is obtained according to an algorithm:

```
if(var(x1)==0&& var(x2)==0) {
    y=(x1+x2)/2
}
else{
    y=(var(x1)*x1+var(x2)*x2)/(var(x1)+var(x2))
}
``` where x1 denotes the gamma corrected value, x2 denotes the inverse gamma corrected value, var(x1) denotes the variance of the gamma corrected value, and var(x2) denotes the variance of the inverse gamma corrected value.

5. The dynamic range enhancement method of claim 1, wherein the selecting step for expanding a dynamic range of the input image includes transforming brightness and color information reproduced through variance comparison and selection to red, green, and blue (RGB) information.

6. A dynamic range enhancement apparatus comprising:

a YUV transformer for extracting brightness information (Y) and color information (UV) from an input image;

a gamma corrector for correcting the brightness information of an input image as a gamma corrected image;

an inverse gamma corrector for correcting the brightness information inversely of said input image to provide an inverse gamma corrected image; and a weighted averager for taking output values of the gamma corrector and the inverse gamma corrector and for expanding a dynamic range of the input image by averaging the output values using a weighted average.

7. The dynamic range enhancement apparatus according to claim 6, wherein separate copies of the input image are gamma corrected by the gamma corrector and inverse gamma corrected by the inverse gamma corrector.

8. The dynamic range enhancement apparatus of claim 6, wherein the weighted averager separates a gamma corrected image and an inverse gamma corrected image, compares variances of the gamma corrected image and the inverse gamma corrected image at identical spots, and selects one of the variances at each spot.

9. The dynamic range enhancement apparatus of claim 6, wherein the weighted averager is expressed as an algorithm:

```
if(var(x1)==0&& var(x2)==0) {
    y=(x1+x2)/2
}
else{
    y=(var(x1)*x1+var(x2)*x2)/(var(x1)+var(x2))
}
``` where x1 denotes the gamma corrected value, x2 denotes the inverse gamma corrected value, var(x1) denotes the variance of the gamma corrected value, and var(x2) denotes the variance of the inverse gamma corrected value.

* * * * *